US008340194B2

(12) United States Patent
Schmidt et al.

(10) Patent No.: US 8,340,194 B2
(45) Date of Patent: Dec. 25, 2012

(54) HIGH-YIELD MULTI-THREADING METHOD AND APPARATUS FOR VIDEO ENCODERS/TRANSCODERS/DECODERS WITH DYNAMIC VIDEO REORDERING AND MULTI-LEVEL VIDEO CODING DEPENDENCY MANAGEMENT

(75) Inventors: Jochen Christian Schmidt, Santa Barbara, CA (US); Paul Seung Ho Chang, Santa Clara, CA (US); Chris Yoochang Chung, Sunnyvale, CA (US); Christian Luc Duvivier, San Jose, CA (US); Ionut Hristodorescu, San Jose, CA (US); Hsi-Jung Wu, San Jose, CA (US); Dazhong Zhang, Santa Clara, CA (US); Xiaosong Zhou, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 691 days.

(21) Appl. No.: 12/479,336

(22) Filed: Jun. 5, 2009

(65) Prior Publication Data
US 2009/0310685 A1    Dec. 17, 2009

Related U.S. Application Data

(60) Provisional application No. 61/059,600, filed on Jun. 6, 2008.

(51) Int. Cl.
*H04N 11/04* (2006.01)
(52) U.S. Cl. .................................. 375/240.24
(58) Field of Classification Search .................. 345/505; 375/240; 382/234, 236
See application file for complete search history.

(56) References Cited

U.S. PATENT DOCUMENTS

| 6,124,866 A * | 9/2000 | Asano et al. .................. 345/505 |
| 2007/0053437 A1* | 3/2007 | Muller et al. ............. 375/240.24 |
| 2007/0086528 A1* | 4/2007 | Mauchly et al. ......... 375/240.24 |
| 2007/0098276 A1* | 5/2007 | Reese ........................... 382/234 |
| 2007/0188505 A1* | 8/2007 | Bivolarski et al. ............. 345/505 |
| 2008/0240254 A1* | 10/2008 | Au et al. .................. 375/240.24 |
| 2010/0104017 A1* | 4/2010 | Faerber et al. ........... 375/240.16 |

OTHER PUBLICATIONS

He et al., "A Software-Based MPEG-4 Video Encoder Using Parallel Processing", IEEE Transactions on Circuits and Systems for Video Technology, vol. 8, No. 7, Nov. 1998.*

* cited by examiner

*Primary Examiner* — Thai Tran
*Assistant Examiner* — Stephen Smith
(74) *Attorney, Agent, or Firm* — Kenyon & Kenyon LLP

(57) ABSTRACT

Disclosed is an exemplary video coder and video coding method according to an embodiment of the present invention. The exemplary video coder includes a scheduler, a plurality of processors and a multiplexer. The scheduler can examine processing units in an input buffer to determine an order for the processing unit to be coded by a processor. If the processing unit under examination depends on a processing unit not yet processed, the processing unit under examination can be merged with other processing units, if any, that share a similar dependency. If the processing unit under examination does not depend on any processing units not yet processed, it can be sent to a next available processor for coding. When a processing unit is sent to a processor, any merged processing units that depend on sent processing unit can also be sent to a next available processor.

19 Claims, 5 Drawing Sheets

HIGH-YIELD MULTI-THREADING METHOD AND APPARATUS FOR VIDEO ENCODERS/TRANSCODERS/DECODERS WITH DYNAMIC VIDEO REORDERING AND MULTI-LEVEL VIDEO CODING DEPENDENCY MANAGEMENT

PRIORITY CLAIM

The present application claims priority to provisional application 61/059,600, filed Jun. 6, 2008, the contents of which are incorporated herein in their entirety.

BACKGROUND

The present invention relates to a method of analyzing data to schedule processing of the data for more efficient use of codec processing resources.

Modern video coders use a hybrid approach of prediction and transform coding to reduce the bandwidth of coded signals. For processing purposes, a coded picture is divided into smaller units referred to as "macroblocks", a fundamental coding unit. On the pixel level, there are two forms of prediction in video coding: temporal and spatial. In spatial prediction, pixels of already reconstructed blocks in the current picture are employed in directional extrapolation and/or averaging, in order to predict the block currently being processed. In temporal prediction, previous pictures may serve as "reference pictures" and be used to predict pixel blocks (macroblocks or smaller units) in the current picture. Temporal prediction can be described by a motion vector (displacement from the reference picture), a reference picture and/or prediction weights. Motion vectors may also be predicted. When a picture is marked as a reference picture, after reconstruction, the decoder stores it in a reference picture buffer for prediction of future pictures. The encoder prediction loop contains a decoder, replicating the decoder-side behavior at the encoder. After prediction, prediction residuals are transformed, typically for energy compaction, quantized and converted from 2D into 1D-data via a scanning order. The resulting data is then written to the bitstream via an entropy coding method. The prediction loops and the bitstream as outlined above introduce operation serialization, making it difficult to execute operations in parallel. Further, for compression efficiency, pictures may be encoded out of (display) order, which results in additional delay when the encoder/decoder has to wait for full reconstruction of reference picture. A number of techniques for mitigating this problem using concurrent processing approaches (i.e. "multi-threading") are known.

Encoder, transcoder (a special form of an encoder that converts an already compressed bitstream according to a standard/profile/specification and encodes it into a different standard/profile/specification), and decoder implementations can be threaded in a number of different ways to take advantage of multiple processing units available in the computing devices. Presently, there are three common threading methods: 1) slice-based threading, 2) function-based threading, and 3) picture-based threading.

A slice is an independent unit on the bitstream-level, and contains a collection of macroblocks in one picture. Each picture may contain one or more slices. Slice-based threading processes multiple slices within one picture in parallel with each slice being allocated to one processor at any one time. It is more efficient if the number of slices is greater or equal than the number of processors. Further, slice-based threading requires the threads to wait or block until the completion of all threads before proceeding to the next picture, resulting in underutilized computational resources and significant wait times when the amount of computation is distributed unequally between slices. Slice-based threading introduces serialization of tasks that cannot be factored into independent threads.

Function-based threading processes stages of functions in a pipeline fashion with each stage being allocated to one processor at any one time. These functions may include bitstream parsing, data prediction, transformation and (inverse) quantization, reconstruction and post-filtering. The number of stages, i.e. the individual functions in the video pipeline and their granularity, limits scalability. Granularity, that is too coarse, results in poor resource utilization, while overly fine granularity may introduce significant threading overhead. Another problem with this approach is that there are often significant data dependencies among stages that may result in synchronization overhead (e.g. memory traffic and the like).

Picture-based threading processes multiple pictures in parallel by assigning one picture to one processor at any one time. In this scheme, a coding unit (e.g. slice, a row of macroblocks, or an individual macroblock) can be processed as soon as all reference data is available. Picture-based threading avoids or ameliorates the issues of the first two threading methods, but is coarse grained in the synchronization among the threads, which may incur unnecessary stalling of threads.

The inventors noticed a need for more efficient grouping of data when processing video (e.g., encoding, transcoding, decoding) to improve processor utilization while minimizing overhead due to data dependencies. The inventors of the present application propose several processing improvements to a video coding system as described herein.

DETAILED DESCRIPTION

Embodiments of the present invention provide methods for analyzing data to schedule processing according to an embodiment of the present invention. An exemplary method includes determining a coding order for blocks of data in an input buffer, wherein the data blocks are a subsets of the data in the input buffer. The data blocks are examined, in the coding order, to determine whether the data block contains data that depends on a data block not yet scheduled for coding. If it is determined the data block depends on a data block not yet scheduled for coding, the data block is merged with other data blocks having a similar dependency. Otherwise, the data block is scheduled for coding by a next available processor from a plurality of processors. The process repeats for the next data block in the coding order.

Embodiments of the present invention also include a video processing system (encoder or decoder) that comprises an input buffer, a scheduler, a plurality of processors, and a multiplexer. The scheduler examines data units in the input buffer to determine an order for the data unit to be processed by a processor. Processors receive data units from the scheduler based on the order determined by the scheduler. The multiplexer merges coded data units output from the plurality of processors and delivers the processed data units to a data buffer.

Figure 1:
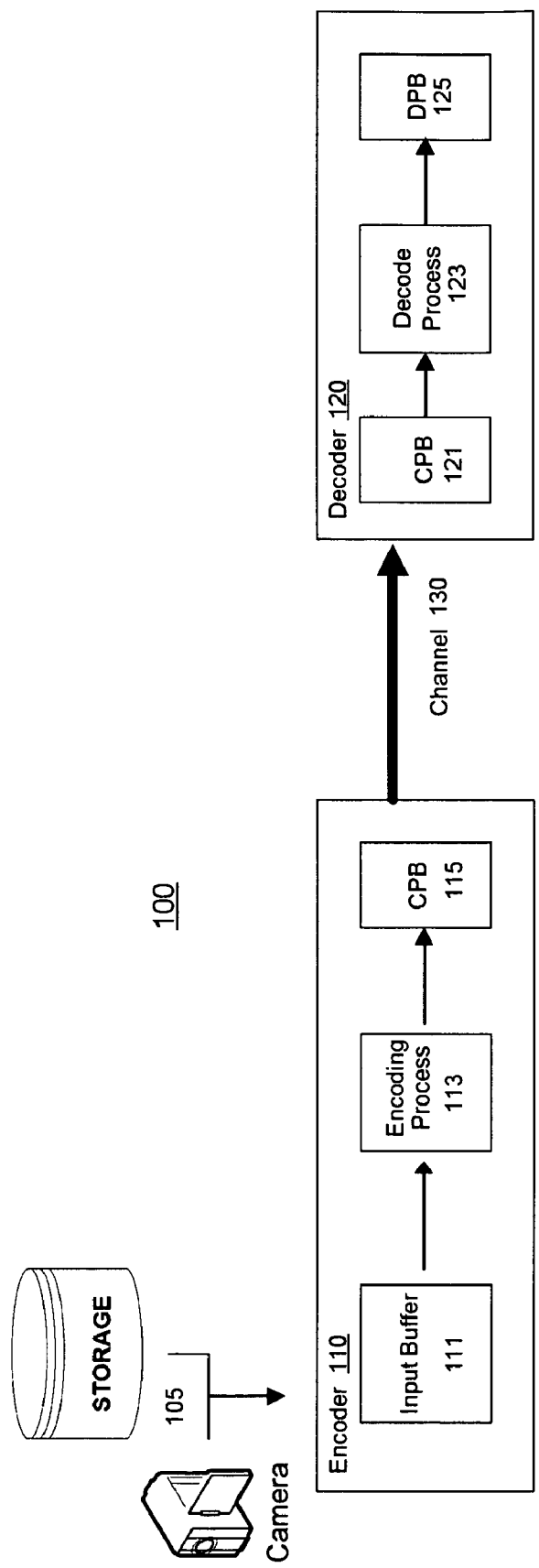
FIG. 1 is a high-level block diagram of a video coder/decoder system.

FIG. 1 is a simplified block diagram of a video encoder/decoder 100 according to an embodiment of the present invention. As illustrated, a video encoder 110 can include an input buffer 111, an encoding process 113 implemented on a processor, and a coded picture buffer (CPB) 115. The input buffer of the encoder 110 can receive video source data 105 from a variety of sources such as a camera or a database or some other source. Encoder 110 can store and deliver coded video data to a video decoder 120 via a channel 130. Encoder 110 can make coding decisions designed to eliminate temporal and spatial redundancy from a source video sequence. Video decoder 120 can receive data from the channel 130 at a coded picture buffer (CPB) 121, generate a replica of the source video sequence from the coded video data via a decode process 123 implemented on a processor, and makes available to other devices the replica sequence via a decoded picture buffer (DPB) 125.

Figure 2:
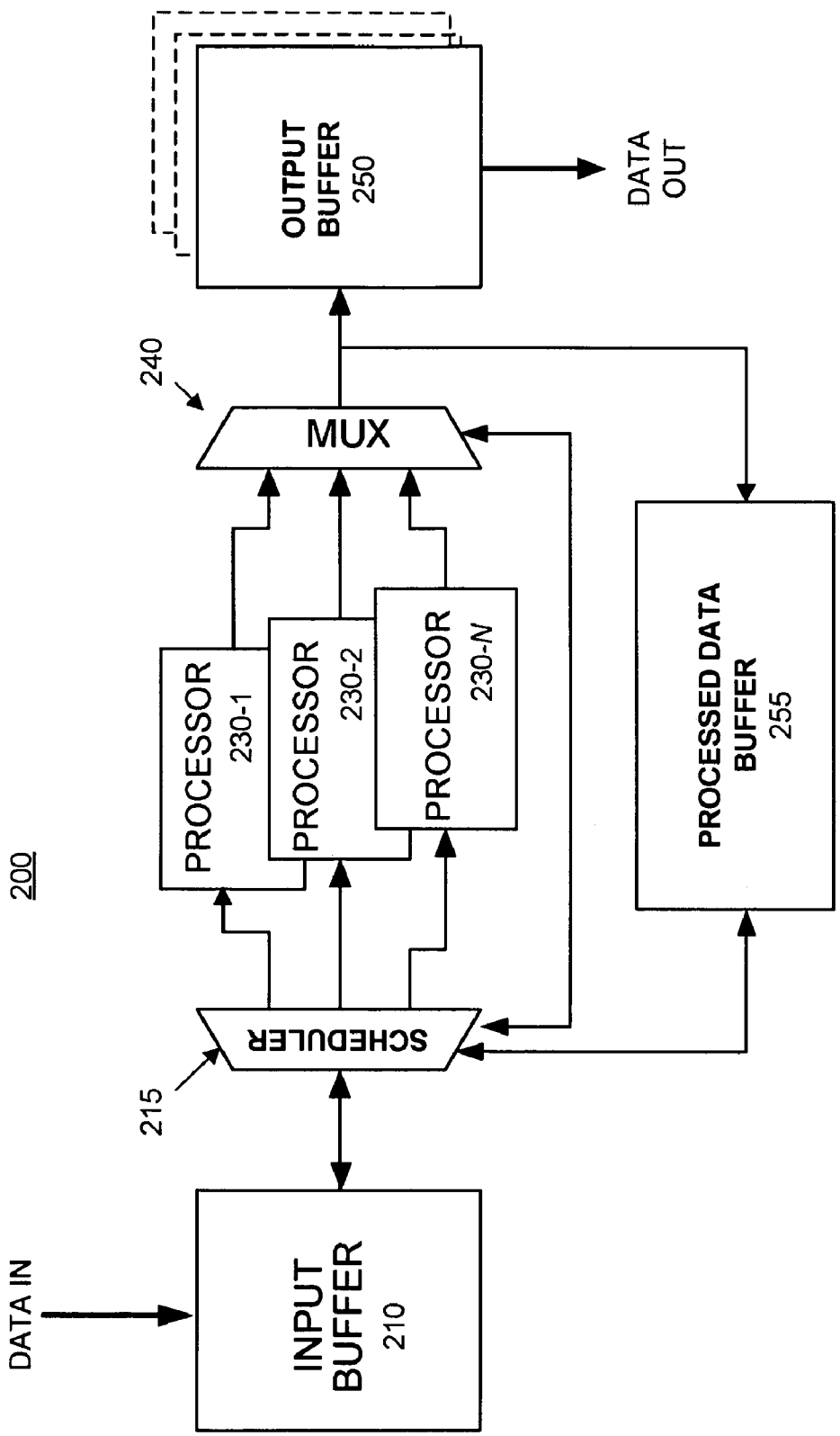
FIG. 2 illustrates parallel processing according to an embodiment of the present invention.

FIG. 2 illustrates an exemplary system for parallel processing of data according to an embodiment of the present invention. The exemplary system 200 comprises an input buffer 210, a scheduler 215, a plurality of processors 230-1 to 230-N, a multiplexer (mux) 240 and an output buffer 250. In the exemplary system 200, the input buffer 210 provides source data from a video data source, such as a video camera, live-feed video, a data storage device such as a flash memory or database. The input buffer 210 can be any memory device or plurality of memory devices having sufficient capacity and performance characteristics for receiving, storing and/or outputting the stored video data to the scheduler 215. The data in input buffer 210 can be forwarded to scheduler 215.

The scheduler 215 acts as an out-of-order task scheduler. The scheduler 215 scans among data in the input buffer 210 to identify units of source video data that can be processed independently of other units. The scheduler 215 retrieves multiple independent units and routes the multiple independent units to one or more or a combination of processors 230-1 to 230-N for processing. The scheduler 215 can simultaneously identify multiple independent units and simultaneously schedule the processing of the identified multiple independent units. The scheduler 215 has inputs for receiving signals from devices, such as the mux 240 or processed data buffer 255, outputs for sending video source data to a processor 230-1 to 230-N, and outputs for sending signals to devices, such as mux 240 or processed data buffer 255. Although shown as an individual block, the functions performed by scheduler 215 can be distributed among a number of devices. The scheduler 215 can access the processed data buffer 255 to determine whether any dependencies have been resolved for processing units containing source data that are waiting to be scheduled for processing.

The multiple processors 230-1 to 230-N provide plural independent processing resources (e.g., independent CPUs) that perform operations on input video data sent by the scheduler 215. The processors 230-1 to 230-N may perform common video codec processing tasks, e.g., bitstream generation, bitstream parsing, prediction, motion estimation/compensation, reconstruction, filtering and the like. Some of these functions may rely on previously coded data, which is available either in other coded processing units or locally at the respective processor. Examples of processors include general-purpose CPUs executing specialized software, stream processors (e.g. DSPs or general-purpose programmable GPUs), or specialized chips (e.g., FPGAs, ASICs and the like). Further, available computing resources can be heterogeneous, i.e., a mixture of different types of specialized computing resources (CPU, GPU, FPGA, reconfigurable FPGA, special purpose ASIC and the like). In one embodiment, the scheduler 215 can be aware of a functional specialty of the available processors 230-1 to 230-N. In another alternative embodiment, plural output buffers 250 may be provided, each of the plural output buffers 250 dedicated to a processor 230-1 to 230-N, and each of the plurality of output buffers 250 containing the same data output from mux 240. The data in the output buffer 250 may be used to determine the processing that will be performed on the data by one of the processors 230-1 to 230-N. Alternatively, a scheduler 215 can provide input signals for distribution by the mux 240 of the coded data to the plurality of processors 230-1 through 230-N.

The mux 240 acts as an in-order arranger, which arranges the coded data in an output order, which can signal, via the scheduler 215, for example, a processing function to stop performing. The mux 240 merges data output from the various processors 230-1 through 230-N in a manner that meets the syntax of a governing coding protocol. The mux 240 can also send to (or receive from) the scheduler 215 any information required for scheduling, including providing data that tracks dependencies of the encoded data units and updates of the execution/scheduling status of units as depended-upon data becomes available. The output buffer 250 can store video data that has finished processing from the mux 240 or forward the data over a channel to an output or storage device. The output buffer 250 can have outputs for indicating performance capabilities of the output buffer to the scheduler 215.

Figure 3:
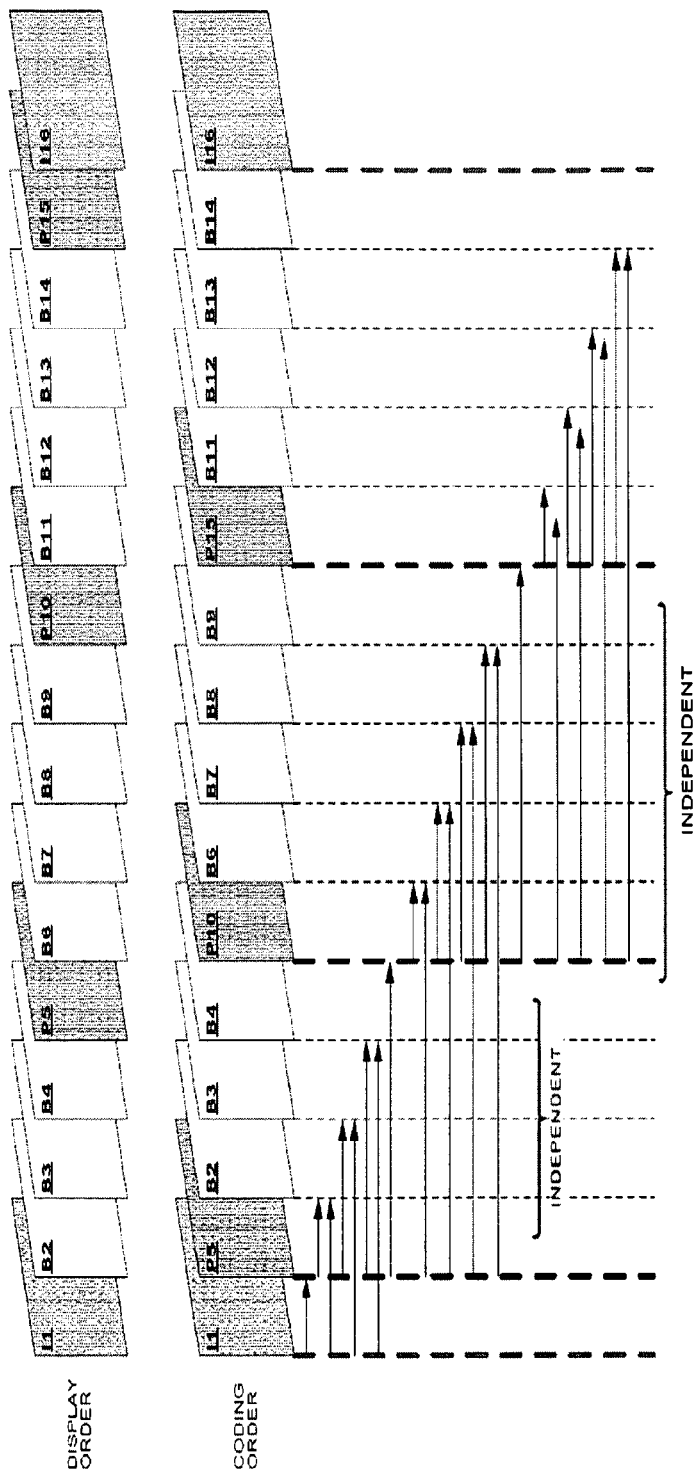
FIG. 3 illustrates a scene comprising a plurality of pictures is analyzed on a picture-by-picture basis for dependencies.

The scheduling functions of the scheduler 215 will be described in more detail with reference to FIGS. 3, 4A and 4B. FIG. 3 illustrates a scene comprising a plurality of data units that are to be analyzed for processing according to an embodiment of the present invention as shown in FIG. 3. The display order 301 of the data units, such as pictures I1, B2, B3 B4, P5, and so on, is analyzed on a picture-by-picture basis for dependencies between the different pictures. The I1 picture is an intra-picture reference picture and is an independent picture, or, in other words, a picture in which no additional data is needed to decode because I pictures do not employ prediction from other pictures and thus immediately contain all data necessary for decoding. In contrast, inter-pictures (P and B pictures) contain difference information from previously processed pictures. Further, all pictures may themselves serve as a reference when processing a future picture.

Other examples of independent processing units include a group of pictures (GOP), intra-pictures (such as I1), non-reference inter-pictures, reference inter-pictures without forward (or future) dependencies, or pictures that depend on pictures that are already coded, decoded or scheduled for coding or decoding. A non-reference inter-picture does not contain data necessary for processing of another picture.

In an exemplary embodiment, the inter-dependencies can be further analyzed to determine whether they refer to a picture being scheduled. If a picture being scheduled does not refer to a reference picture, the picture to be scheduled can be considered independent. For example, as shown in FIG. 3, pictures B2-B4, as a group of pictures, can be labeled as independent because no other pictures after them in processing order refer to them. Similarly, pictures P10 and B6-B7 can be considered independent, as a group of pictures. Otherwise, the scheduled picture is considered to be dependent when it refers to either a reference picture or another non-reference picture. The pictures that are dependent can be logically grouped and scheduled for later parallel processing. The later parallel processing of the grouped pictures can be performed when the pictures from which the group of pictures depend have been processed.

Other independent tasks in encoding/decoding can be scheduled for processing as well (e.g., pre-processing, motion estimation, and bitstream generation in the encoder and bitstream parsing and post-processing in decoder). The results of the independent tasks can be fed back from, for example, the Mux 240 to scheduler 215 in FIG. 2 for further processing.

Figure 4A:
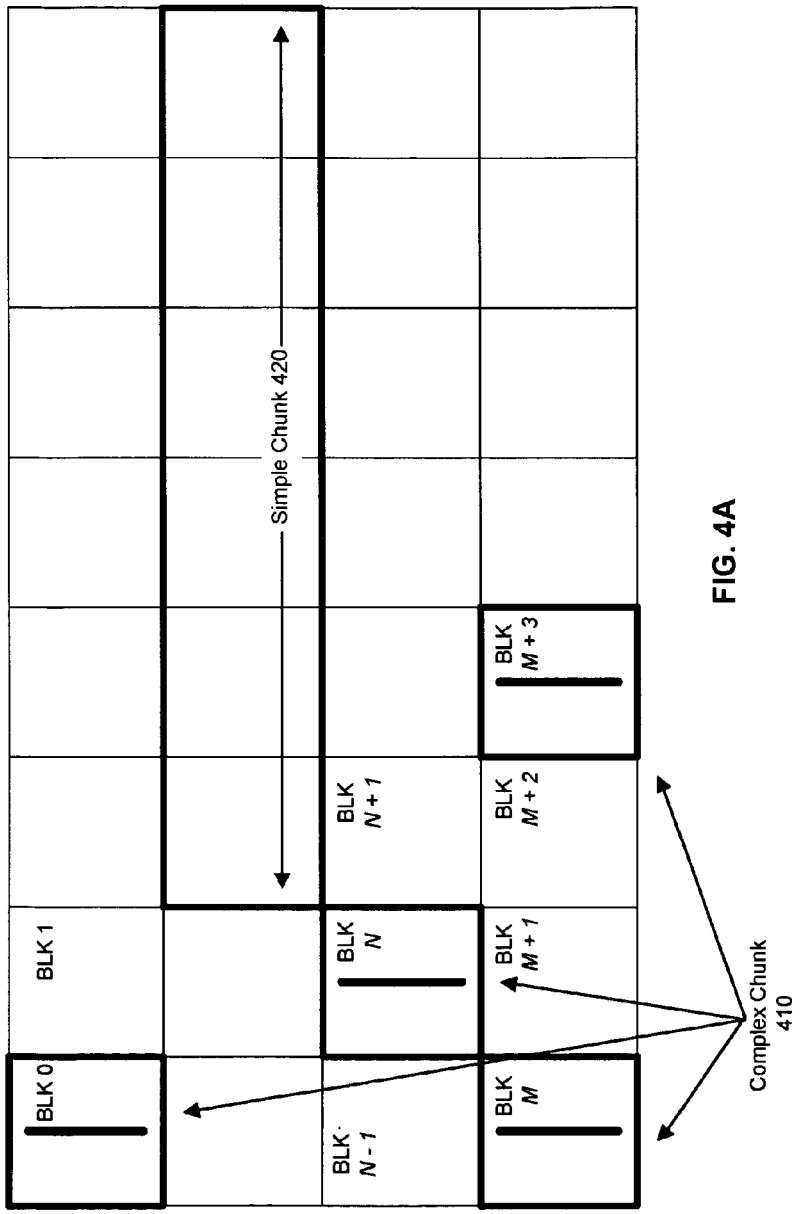
FIG. 4A illustrates a conceptual representation of a set of pixel blocks that can be processed in parallel according to another embodiment of the present invention.
Figure 4B:
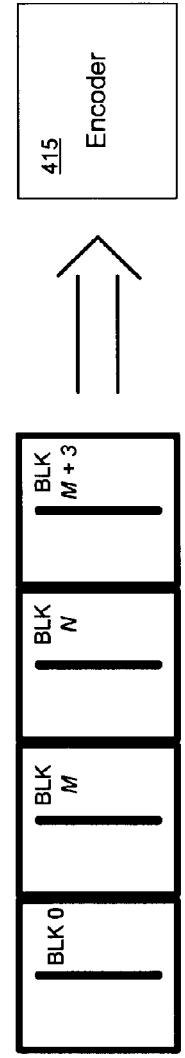
FIG. 4B illustrates an exemplary processing order of the chunks presented for encoding according to an exemplary embodiment of the present application.

FIG. 4A illustrates a representation of a picture organized into by macroblocks. In the FIG. 4A, the picture 400 is comprised of macroblocks in a 4×8 rectangle, which is shown for ease of explanation. Of course, the picture 400 can be comprised of any number of macroblocks as desired by the user. Within the present discussion, the term "chunks" refers to an arbitrary number of macroblocks that are related to each other in a predetermined manner. For example, chunks can be a group of inter-macroblocks, a group of intra-macroblocks, or a mixed group of inter- and intra-macroblocks, and can be a data unit that can be scheduled for a processor. Chunks can be a set of one or more macroblocks that are not necessarily adjacent to one another. A simple chunk 420 can be a set of adjacent macroblocks, while a complex chunk 410 can be a set of macroblocks (BLK 0, BLK N, BLK M and BLK M+3) that are scattered as shown in FIG. 4A.

Independent chunks, i.e., chunks that can be processed without referencing other chunks in the same or another picture, can be scheduled for parallel processing before any other chunks.

Dependent chunks can be processed in their order of importance to other dependent chunks. These dependencies may be caused by the serializing nature of the bitstream, or prediction from other chunks. Temporal prediction (e.g., motion vector and pixel data) introduces dependencies to the referenced picture(s), as well as depending on chunks in the current picture for motion vector prediction (motion vectors can be encoded differentially). Further, spatial prediction results in dependencies on chunks in the current picture: a motion vector prediction model as well as the actual pixel-based prediction can be formed from already processed chunks in the current picture. Chunks waiting to be scheduled for processing are scheduled as soon as the chunks on which they depend finish processing. As shown in FIG. 4B, the macroblocks (BLK 0, BLK N, BLK M and BLK M+3) representing complex chunk 420 may be arranged for processing by an encoder 415 in the processing order shown due to their dependencies.

An example of chunk processing is inter-chunks followed by intra-chunks. Recall that inter-chunks are chunks that refer to other chunks in the picture. The inter-chunks require pixel data from neighboring pixel blocks, but the intra-chunks do not need any additional data. The intra-chunks may be non-consecutive chunks of data that can be grouped together for parallel coding. The inter-chunks can be processed in parallel first. Intra-chunks can be processed later. Complex chunk 410 and simple chunk 420 can be either an inter-chunk or an intra-chunk.

After scheduling (by, for example, scheduler 215 of FIG. 2), either chunk 410 or 420 can be processed as a thread or a group of threads by dividing the task into multiple smaller tasks (e.g., function-based processing in a pipelined fashion), and forwarded to an appropriate or combination of appropriate processors 230-1 through 230-N.

Figure 4B:

The dependencies of each chunk on other chunks in the same or another picture are actively managed by checking the availability of the dependent data at different levels of picture granularity, such as picture-level or slice level dependencies, which were previously described. The dependency checks can also be performed at the macroblock-level or below (sub-macroblock, which can be a smaller partition of a macroblock). For example, each partition of a macroblock may be predicted from a different reference picture, such as a first partition of a macroblock BLK M being predicted from BLK N-1 in FIG. 4 and a second partition of macroblock BLK M being predicted from BLK M+1. A limiting dependency, in the case of chunk encoding, where there are a number of macroblocks grouped together, is the chunk with the reference data that will finish processing last because other chunks may be dependent upon reference data in the chunk that finishes processing last. Propagating this limiting dependency up to higher levels of the video bitstream hierarchy, so the chunk with the greater number of dependencies if processed soon eliminates most dependency checks. This allows macroblocks with similar dependencies to be grouped into the same chunk for scheduling/processing. Further, multiple chunks can be merged into fewer, but larger chunks to eliminate processing-time overhead for dependency checking. Examining all dependencies and again propagating the dependencies on chunks that are processed earlier can reduce the number of chunks even further. The trade-off is between fine chunk granularity (resulting in fewer dependencies and thus earlier scheduling) and processing-time overhead for dependency checks, scheduling and communication. In other words, finer chunk granularity can result in less processing overhead, for redundancy checks, scheduling and communication, but requires more processing time because of the finer granularity. Finally, the data is processed according to the dependencies found during the various checks with the independent data being processed first, for example, in parallel with dependent data processed next, also, for example, in parallel. In other embodiments, the independent and dependent data may not be processed in parallel.

Figure 5:
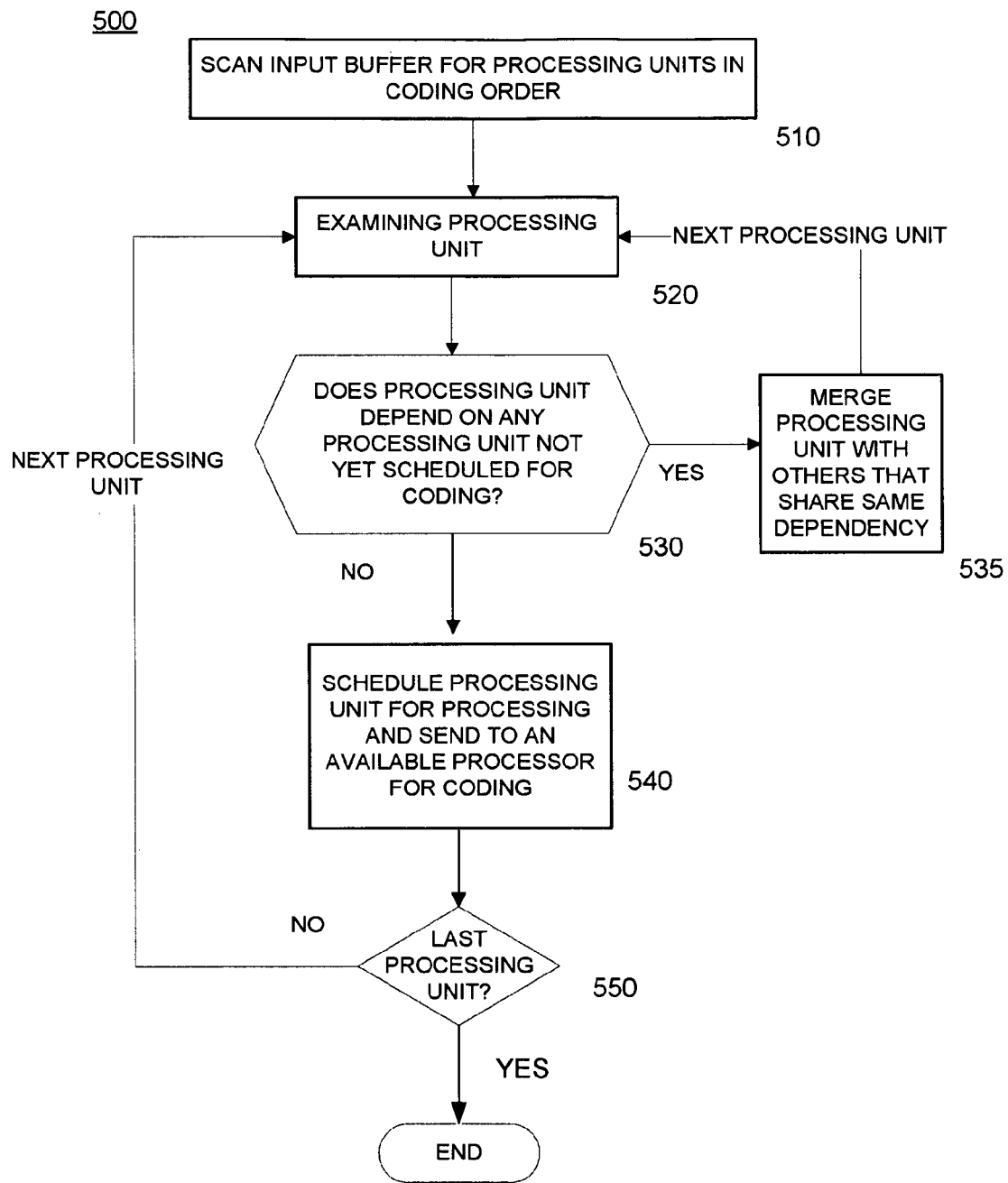
FIG. 5 is a flow diagram of an exemplary process according to an embodiment of the present invention.

FIG. 5 illustrates an exemplary process for scheduling the coding of data. In an exemplary embodiment, an input buffer is scanned in the coding order. The process 500 can be performed by a system that utilizes a single processor or a number of different processors. Based on the scan of the input buffer, a first processing unit, e.g., a chunk, a macroblock, slice or any size of data being operated on, is examined at step 510 and assigned a place in a processing order. The processing order may be influenced by the picture type and processing order decision. The processing order decision may be determined by pre-processing, e.g. to detect scene changes, correlations and texture similarity between pictures for prediction and the like. The data size, i.e., chunk, macroblock, slice, pixel, can be determined at the scanning step 510 by the input buffer or may be known a-priori. The entire input data can be divided into a number of processing units.

At step 520, the processing units are examined. The examined processing unit is analyzed, at step 530, to determine whether any of the data in the processing unit relies on any data in other processing units that has not yet been processed. If the data in the examined processing unit does rely on unprocessed data, it is merged, at step 535, with other processing units flagged as depending on the earlier processing units that share similar dependencies. A shared similar dependency can be a dependency that two or more processing blocks have on a same processing unit or a sub-block, i.e., macroblock or pixel block, within the same processing unit. The processing units merged at step 535 can be stored in the input buffer or another storage device until the processing unit on which the merged processing units depend are processed. From step 535, the next processing unit is then examined as the process 500 returns to step 520.

If it is determined at step 530 that the processing unit does not depend on any unprocessed data, the processing unit is scheduled at step 540 for coding by the next available processor. If any of the processing units grouped in step 535 depend on the processing unit scheduled at step 540, these merged processing units are also scheduled for processing by the next available processor.

At step 550, it is determined whether any processing units remain, if so, the process 500 returns to step 520 to examine the next processing unit. Otherwise, the process 500 ends.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for analyzing data to schedule coding of the data, comprising:
   determining a coding order for blocks of data in an input buffer, wherein the data blocks are subsets of the data in the input buffer;
   examining a data block, in the coding order, to determine whether the data block contains data that depends on a data block not yet scheduled for coding;
   if the data block is determined to depend on a data block not yet scheduled for coding, merging the data block with other data blocks having a similar dependency;
   otherwise, scheduling the data block for coding by a next available processor from a plurality of processors, and
   repeating the examining for a next data block in the coding order.

2. The method of claim 1, wherein the scheduling comprises:
   scheduling for coding any merged data blocks that depend on the data block scheduled for coding by the next available processor.

3. The method of claim 1, wherein the input buffer is divided into a number of equally-sized blocks of data.

4. The method of claim 3, wherein the equally-sized data blocks can be grouped together into arbitrarily sized data blocks.

5. The method of claim 4, wherein the grouped data blocks can be a group of non-consecutive data blocks from the input buffer.

6. The method of claim 1, wherein the next available processor is selected from a plurality of processors.

7. The method of claim 1, wherein the merging comprises:
   merging data blocks based on the results of dependency checks of the data blocks,
   wherein data blocks determined to be dependent upon one another are merged together for processing.

8. A video coder, comprising:
   a scheduler for examining processing units in an input buffer to determine an order for the processing units to be coded by a processor;
   a plurality of processors that receive processing units for coding from the scheduler based on the order determined by the scheduler; and
   a multiplexer for merging coded processing units output from the plurality of processors and delivering the coded processing unit to a data buffer;
   wherein the scheduler is configured to:
      determine whether a processing unit depends on a processing unit that has not yet been processed,
      if the processing unit is determined to depend on a processing unit not yet processed, merging the processing unit with other processing units sharing a similar dependency;
      otherwise, scheduling the processing unit for coding by a next available processor from the plurality of processors.

9. The coder of claim 8, wherein the scheduler further comprises inputs for receiving signals from the multiplexer indicating coding status of the coded processing units output by the plurality of processors.

10. The coder of claim 8, wherein the scheduler comprises an input for receiving signals indicating performance capabilities of the output buffer.

11. The coder of claim 8, wherein the plurality of processors have a variety of encoding capabilities.

12. The coder of claim 8, wherein the scheduler is configured to perform the function of:
    merging processing units based on the results of dependency checks of the data blocks, wherein processing units determined to be dependent upon one another are merged together for processing as a processing unit.

13. The coder of claim 12, wherein the scheduler is further configured:
    to confirm whether previously unresolved dependencies of a processing unit have been resolved.

14. The coder of claim 12, wherein the processing unit is a picture.

15. The coder of claim 12, wherein the processing unit is a slice of a picture.

16. The coder of claim 12, wherein the processing unit is a macroblock in a picture.

17. The coder of claim 12, wherein the processing unit is a chunk from a picture.

18. The coder of claim 17, wherein the chunk is a complex chunk, wherein a complex chunk comprises an arbitrary number of pixel blocks, a group of inter-macroblocks, a group of intra-macroblocks, or a mixed group of inter- and intra-macroblocks.

19. The coder of claim 8, wherein the data buffer to which the coded processing unit is sent is an output buffer or, if further processing of the coded processing unit is required, a processed data buffer.

* * * * *